United States Patent [19]
Bravet et al.

[11] Patent Number: 4,818,622
[45] Date of Patent: Apr. 4, 1989

[54] PROCESS AND DEVICE FOR THE PRODUCTION OF A SAFETY PANE

[75] Inventors: Jean-Louis Bravet; Francois de Toytot, both of Thourotte, France

[73] Assignee: Saint-Gobain Vitrage, Aubervilliers Cedex, France

[21] Appl. No.: 819,019

[22] Filed: Jan. 15, 1986

[30] Foreign Application Priority Data

Jan. 15, 1985 [FR] France ............... 85 00496

[51] Int. Cl.$^4$ ............ B05D 5/06; B32B 27/40
[52] U.S. Cl. ............... 428/425.6; 427/168; 427/389.7; 427/426
[58] Field of Search ............ 427/168, 389.7, 426; 428/425.6

[56] References Cited

U.S. PATENT DOCUMENTS

| | | | |
|---|---|---|---|
| 3,133,702 | 5/1964 | Stelchek | 118/300 |
| 3,440,086 | 4/1969 | Kerns | 427/426 |
| 3,671,370 | 6/1972 | Littel . | |
| 3,979,548 | 9/1976 | Schafer et al. | 428/437 |
| 4,195,148 | 3/1980 | Hagin | 427/426 |
| 4,232,080 | 11/1980 | Orain | 428/437 |
| 4,234,445 | 11/1980 | Hagen | 427/426 |
| 4,590,030 | 5/1986 | Gilner et al. | 264/331.19 |

FOREIGN PATENT DOCUMENTS

| | | |
|---|---|---|
| 0131523 | 1/1985 | European Pat. Off. . |
| 0144065 | 12/1985 | European Pat. Off. . |
| 2059907 | 6/1971 | France . |
| 2320563 | 4/1977 | France . |
| 1311464 | 3/1973 | United Kingdom . |
| 1576394 | 10/1980 | United Kingdom . |

*Primary Examiner*—Janyce Bell
*Attorney, Agent, or Firm*—Oblon, Fisher, Spivak, McClelland & Maier

[57] ABSTRACT

Production of a safety pane comprising a sheet of glass and a polyurethane-based layer having energy-absorbent properties. The polyurethane-based layer having energy-absorbent properties is formed directly on the sheet of glass by reactive spraying of a reactive mixture of an isocyanate component having a viscosity under 5000 centipoises at 40 degrees C. and a polyalcohol component, with the isocyanate component containing at least one aliphatic or cycloaliphatic diisocyanate, or a prepolymer of these isocyanates, with the polyalcohol component containing at least one long difunctional polyalcohol having a molecular mass between 500 and 4000 and at least one short diol as a chain extending agent.

36 Claims, 1 Drawing Sheet

PROCESS AND DEVICE FOR THE PRODUCTION OF A SAFETY PANE

BACKGROUND OF THE INVENTION

1. Field of the Invention

This invention pertains to the production of a compound safety pane comprising a sheet of glass and at least one layer of plastic material presenting energy-absorbent properties.

2. Background of the Prior Art

Compound safety panes containing a sheet of glass and at least one layer of plastic material have already been described in numerous publications.

Thus, French patent publication No. 2 398 606 (=UK 1 576 394) describes a compound pane containing a glass sheet, a layer of plastic material having energy-absorbent properties, formed from a thermoplastic polyurethane made from at least one aliphatic diisocyanate and at least one polyesterdiol or polyetherdiol, with the ratio of equivalent NCO groups to equivalent OH groups being preferably between 0.8 and 0.9, and a layer of plastic material having surface properties, especially good resistance to scratching and abrasion. This pane maintains its good optical properties and adhesion between the elements remains good under highly variable conditions of temperature and humidity, but the biomechanical properties of the pane and especially the resistance to shock are not entirely satisfactory.

Moreover, through European patent publication No. 0 054 491, a compound pane having the structure described above is known and for which the inserted layer of plastic material having energy-absorbent properties has a polyurethane-polyurate base, presenting a linear structure and a carbamide group content of about 1 to 20% by weight, with this polyurethane-polyurate being the reactive product of a prepolymer coming from a polyalcohol compound and an isocyanate compound taken in excess, with at least one diamine. This inserted layer is produced by the extrusion of a polyurethane-polyurate resin or by pouring a solution of said resin and evaporating the solvents, which, in both cases, requires several successive operations.

In the case of the extrusion, it is necessary to conduct a prior synthesis of the resin so that it can be extruded.

Moreover, to obtain the necessary optical quality for the intended application, the sheet must be "pressed". This optical quality obtained, moreover, does not generally last over time, because the plastic material retains its production process in memory and the quality produced by the "pressing" is reduced over time.

In addition, the extrusion of the layer having the energy-absorbent properties presents a problem of assembly with the self-repairing layer.

In the case in which the solution is poured, it is also necessary to conduct a prior synthesis of the resin. Next, the resin must be dissolved in a solvent, then the solution must be poured and the solvent must be evaporated in a repetitive manner to obtain a layer whose thickness is compatible with the desired energy-absorbent nature. The evaporation of the solvent also constitutes a source of harmful effects.

The invention obviates the drawbacks which have been mentioned and proposes a process for the production of a safety pane utilized especially as a vehicle windshield, which presents good optical and biomechanical properties and which maintains said properties under variable conditions of temperature and humidity.

SUMMARY OF THE INVENTION

The pane produced according to the process of the invention, like the aforementioned known panes, includes a sheet of glass which can be hardened, or annealed, a layer of plastic material having energy-absorbent properties, and, if needed, a layer of scratch and abrasion-resistant self-repairing coating.

The process according to the invention consists of directly forming the layer having energy-absorbent properties on the sheet of glass by the reactive spraying of a reactive mixture of an isocyanate component and a component of active hydrogens, especially a polyalcohol component, with the isocyanate component containing at least one aliphatic, cycloaliphatic diisocyanate or a diisocyanate prepolymer, with this component having a viscosity under about 5000 centipoises at +40 degrees C., with the polyalcohol component containing at least one long difunctional polyalcohol having a molecular mass between 500 and 4000 and at least one short diol as a chain extending agent. Reactive spraying is defined as a spraying to form a layer or a film of a liquid mixture of components in the monomer or prepolymer state, followed by a polymerization of this mixture by heat. This reactive spraying which gives the layer its good mechanical and optical properties are described more completely below.

DETAILED DESCRIPTION OF THE INVENTION

Figure 1:
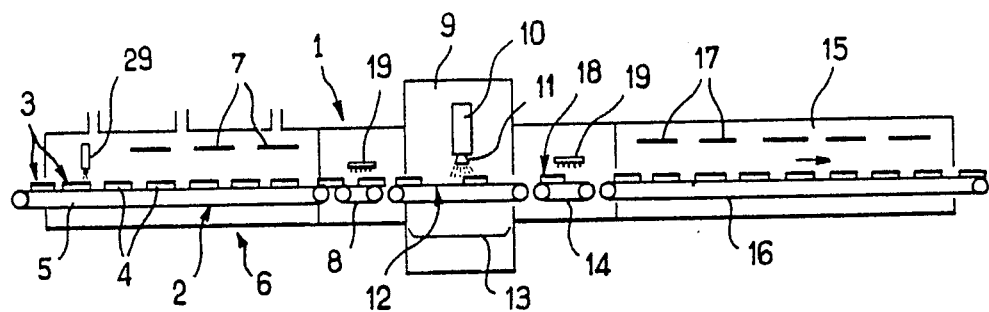
FIG. 1 schematically shows a production line for panes comprising a sheet of glass and an energy absorbent layer formed by reactive spraying.

The proportions of the polyurethane components to be sprayed are chosen to preferably obtain a stoichiometrically balanced system, i.e., with the ratio of the equivalent NCO groups provided by the diisocyanate components to the equivalent OH groups provided by the polyalcohol component, i.e., the long polyalcohol(s) and the short diol(s), being about 1. When the NCO/OH ratio is less than 1, the more it decreases and the more the desired mechanical properties for the application quickly become unsatisfactory. When all of the polyurethane components are difunctional, the lower limit of the NCO/OH ratio to obtain satisfactory mechanical properties is located at about 0.9. When at least one of the components is trifunctional, this lower limit can be decreased to about 0.8. When the NCO/OH ratio is greater than 1, the more it increases the more certain mechanical properties of the layer formed by reactive spraying are reinforced, for example, the layer becomes more rigid, but, given the higher cost of the isocyanate component with respect to that of the polyalcohol component, the choice of these NCO/OH ratios which is approximately equal to 1 is a good compromise between the properties obtained and the cost.

The proportions between the long polyalcohol and the short diol can vary as a function of the desired properties and also of the ratio of the equivalent groups, with the number of the OH equivalent groups due to the short diol, however, generally representing 20 to 70% of the total equivalent groups of the mixture forming the polyalcohol component in the case in which the ratio of the NCO equivalent groups to the OH groups is about 1. When the proportion of the short diol is increased, the layer is hardened and its module is generally increased.

The appropriate diisocyanates utilized within the framework of the invention are chosen especially from the following aliphatic difunctional isocyanates: hexamethylenediisocyanate (HMDI), 2,2,4-trimethyl-1,6-hexanediisocyanate (TMDI), bis-4-isocyanatocyclohexylmethane (Hylene W), bis-3-methyl-4-isocyanatocyclohexylmethane, 2,2 bis-(4-isocyanatocyclohexyl) propane, 3-isocyanatomethyl-3,5,5-trimethylcyclohexylisocyanate (IPDI), m-xylylenediisocyanate (XDI), m- and p-tetramethylxylylenediisocyanate (m- and p-TMXDI), trans-cyclohexane-1,4-diisocyanate (CHDI), 1,3-(diisocyanatomethyl)-cyclohexane (hydrogenated XDI).

Preferably, IPDI is used alone or in a mixture, especially for reasons of manufacturing cost.

Under one of the aspects of the invention, an isocyanate component containing carbamide functions is utilized. These carbamide functions improve certain mechanical properties of the layer. The proportion of carbamide can represent up to about 10% of the total weight of the isocyanate component having carbamide functions. Preferably, the carbamide content is between 5 and 7% of the total weight of said component. For the aforementioned reason, utilization is preferably alone or in a mixture of 3-isocyanatomethyl-3,5,5-trimethylcyclohexylisocyanate having carbamide functions (IPDI and derivatives).

The suitable long polyalcohols are chosen from the polyetherdiols or polyesterdiols having a molecular mass between 500 and 4000; with the polyesterdiols being the products of the esterification of a diacid such as adipic, succinic, palmitic, azelaic, sebacic, O-phtalic acid, and a diol such as ethyleneglycol, 1,3-propanediol, 1,4-butanediol, 1,6-hexanediol, with the polyetherdiols having the general formula H $+$O—(CH$_2$)$_n+$ $_m$OH with n=2 to 6; m such that the molecular mass is located between 500 and 4000, or the polyetherdiols having the general formula H$+$O—CH(CH$_3$)—CH$_2+m$OH with m such that the molecular mass is also between 500 and 4000. The polycaprolactonediols can also be utilized.

Preferably, a polytetramethyleneglycol (n=4) having a molecular mass of 1000 is used.

The suitable chain extending agents are short diols having a molecular mass under about 300 and preferably under 150, such as: ethyleneglycol, 1-2-propanediol, 1,3-propanediol, 1,2-butanediol, 1,3-butanediol, 1,4-butanediol, 2,2dimethyl-1,3 propanediol (neopentylglycol), 1,5-pentanediol, 1,6-hexanediol, 1,8-octanediol, 1,10-decanediol, 1,12-dodecanediol, cyclohexanedimethanol, bisphenol A, 2-methyl-2,4-pentanediol, 3-methyl-2,4-pentanediol, 2-ethyl-1,3-hexanediol, 2,2,4-trimethyl1,3-pentanediol, diethyleneglycol, triethyleneglycol, tetraethyleneglycol, 2-butyne-1,4-diol, 1,4-butenediol and decynediol which may be substituted and/or etherified, hydroquinone-bis-hydroxyethylether, bisphenol A, etherified by two or four propylene oxide groups, dimethylolproponic acid. In general, the shorter the diol, the harder the layer.

Preferably, 1,4-butanediol, is used, which is a good compromise to obtain a layer which is neither too hard nor too supple, which is sought for this type of application as an energy-absorbent.

One of the characteristics of the layer having energy-absorbent properties is that it is formed by reactive spraying. This reactive spraying, in the case in which the initial components are difunctional, provides a layer which is not entirely thermoplastic when the NCO/OH group ratio is approximately equal to 1.

Reactive spraying involves a rapid polymerization reaction so that the layer is formed in time periods which are suitable for industrial production. This requires a high temperature, of about 80 to 140 degrees C., a temperature at which the secondary branching reactions occur, creating, for example, allophanate groups and/or biurets between the urethane chains, such as:

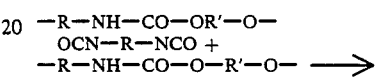

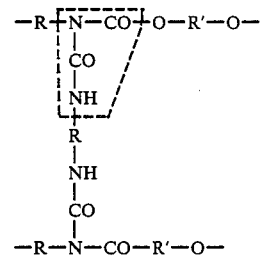

or

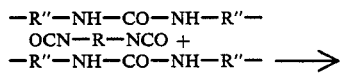

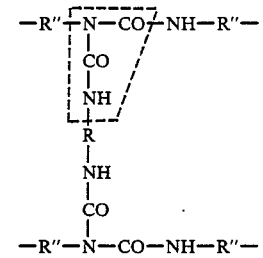

Under these conditions, even with difunctional components, when the NCO/OH ratio is approximately equal to 1 as indicated above, the product obtained is not completely thermoplastic, in fact, it cannot be melted and is insoluble in most of the polyurethane solvents such as tetrahydrofuran, dimethylforamide. This does not present a disadvantage, because the film or sheet has already been formed; on the contrary, from this is drawn the advantage of improved mechanical properties with an equal formulation with respect to an equivalent low-temperature polymerization system in which only a linear polycondensation occurs.

When the NCO/OH ratio is less than one, or less than about 0.8 to 0.9 when the isocyanate is trifunctional, a cross-linkage of the above-described type occurs only in an insignificant manner.

The polyalcohol component can contain a proportion of at least one polyalcohol having a functionality which is greater than two and especially aliphatic triol monomers such as glycerol, trimethylolpropane, triols having polyether chains, polyprolactone triols, with the molecular mass of these triols being generally between 90 and 1000, combined polyether/polyester polyalcohols having a functionality greater than 2, for example, having a functionality between 2 and 3. The addition of a polyalcohol having a functionality greater than 2 causes supplementary coupling bonds between the polyurethane chains and can thus further improve the cohesion of the layer.

The proportions between the long polyalcohol, the short diol and possibly the polyalcohol having a functionality greater than 2 can vary depending on the desired properties. Generally, proportions are chosen such that for a hydroxyl equivalent, the long polyalcohol represents about 0.30 to 0.45 equivalent, the short diol about 0.2 to 0.7 equivalent and the polyalcohol having functionality greater than 2 about 0 to 0.35 equivalent.

Following another formation of the energy-absorbing (EA) layer according to the invention, the isocyanate component can contain limited proportions, for example, under 15%, of NCO equivalent, of at least one triisocyanate, such as a biuret of isocyanate or a triisocyanurate.

Under one aspect of the invention, a part of the polyalcohol component can be replaced by a product having active hydrogens, such as an amine.

The spraying according to the invention can be done by any system which produces a layer which is homogeneous in thickness as well as in composition. This can be an electrostatic spraying.

According to one of the aspects of the invention, the spraying is a high-speed centrifuge spraying which is done using a spray head such as a bowl turning at a speed between 1000 and 80000 revolutions per minute.

To prevent a premature polymerization, the reactive mixture of the polyalcohol component and the isocyanate component is advantageously formed directly in the spray head.

Under one advantageous aspect of the invention, the spraying is done on the glass sheet, which has been preheated. Thus, a good layering is obtained, for example, when the temperature of the support is between about 25 degrees C. and 70 degrees C.

If the surface properties of the layer having energy-absorbent properties which has been formed by spraying are not sufficient for certain applications, it can be necessary to form an additional coating layer having surface properties, which is self-repairing and scratch resistant, by reactive spraying.

The plastic scratch-resistant self-repairing coating layer which is designated in the application according to the invention as the internal protection layer (IP layer) possesses a composition, for example, which is described in French patent publications No. 2 187 719 and 2 251 608 (See U.S. Pat. Nos. 4,232,080 and 3,977,540, respectively). Under normal temperature conditions, this self-repairing layer has a high elastic deformation capacity, a low elasticity module, which is under 2000 daN/cm$^2$ and is preferably under 200 daN/cm$^2$, and a rupture extension of over 60% with less than 2% plastic deformation and preferably a rupture extension of more than 100% with less than 1% plastic deformation. The preferred layers of this type are polyurethanes which can be thermo-hardened having an elasticity module of about 25 to 200 daN/cm$^2$ and an extension of about 100 to 200% with less than 1% plastic deformation.

Examples of monomers which are suitable for the preparation of these polyurethanes which can be thermohardened, especially by reactive spraying according to the invention are, on the one hand, the difunctional aliphatic isocyanates such as 1,6-hexanediisocyanate, 2,2,4-trimethyl-1,6-hexanediisocyanate, 2,4,4-trimethyl-1,6-hexanediisocyanate, 1,3-bis(isocyanatomethyl)benzene, bis(4-isocyanatocyclohexyl)methane, bis(3-methyl-4-isocyanatocyclohexyl)methane, 2,2-bis(4-isocyanatocyclohexyl) propane and 3-isocyanatomethyl-3,5,5-trimethylcyclohexylisocyanate, as well as the biurets, isocyanurates and prepolymers of these components having a functionality greater than 2 and, on the other hand, the polyfunctional polyalcohols, for example, the branched polylacohols such as the polyester polyalcohols and polyether polyalcohols obtained - by the reaction of polyfunctional alcohols, especially 1,2,3-propanetriol(glycerol), 2,2-bis(hydroxymethyl)-1-propanol(trimethylolethane), 2,2-bis(hydroxymethyl)-1-butanol (trimethylolpropane), 1,2,4-butanetriol, 1,2,6-hexane-triol, 2,2-bis(hydroxymethyl)-1,3-propanediol (pentaerythritol) and 1,2,3,4,5,6hexanehexol(sorbitol), with aliphatic diacids such as malonic acid, succinic acid, glutaric acid, adipic acid, suberic acid, and sebacic acid or with cyclic ethers, such as ethylene oxide, oxide of 1,2-propylene and tetrahydrofurane.

The molecular weight of the branched polyalcohols is advantageously about 250 to 4000 and preferably about 450 to 2000. Mixtures of different polyisocyanates and polyalcohol monomers can be utilized. An especially preferable polyurethane which can be thermohardened is that which is described in French patent publication No. 2 251 608.

When the pane is utilized as a motor vehicle windshield, the layer having the energy-absorbent properties (EA layer) generally presents a thickness which is greater than about 0.4 mm. For other applications, this thickness can possibly be reduced. The thickness of the IP layer can vary more widely, being between about 0 and 0.5 mm and preferably between about 0.02 and 0.4 mm.

The layer having energy-absorbent properties and, if needed, the IP layer, can contain various additives which generally serve to facilitate their production by reactive spraying, or which can possibly further improve some of their properties.

They can contain a catalyst such as a tin catalyst, for example, tin dibutyldilaurate, tributyltin oxide, tin octoate, an organomercuric catalyst, for example phenyl mercuric ester, an amine catalyst such as diazabicyclo-[2,2,2]-octane, 1,8 diazabicyclo [5,4,0]-1 decene-7.

These layers can contain a stabilizer such as bis (2,2,6,6-tetramethyl-4-pipridyl)sebacate, a phenolic anti-oxidant.

They can also contain a layering agent such as a silicone resin, a fluoroalkyl ester, an acrylic resin.

The invention also pertains to a device comprising a line for the production of a safety pane containing a glass sheet and at least one layer of plastic material presenting energy-absorbing properties obtained by spraying a mixture of reactive components.

The production line comprises two zones:a spraying zone and a polymerization zone for the provided material and, if appropriate, a prior thermal or chemical treatment zone for the glass sheet to be coated.

According to the invention, the production line comprises a conveyor for the transfer of the glass sheets to be coated, if need be, means to prepare or treat the sheets of glass to be coated, with these means being placed in the upstream part of the line, especially above the conveyor, means to spray the reactive mixture from which the EA layer is formed, means for the polymerization of the layer which is formed. According to an advantageous embodiment of the device, the entire production line is placed in a long enclosure which is divided into compartments corresponding to the different zones.

The means to spray the reactive mixture are advantageously a sprayer having a high-speed turning head.

The means to prepare the glass sheet before spraying can be heating means. These means can be infrared ramps, which can heat the glass sheet which is to be coated to a sufficient temperature.

These means to prepare the glass sheet can also be means to chemically treat the surface receiving the spray, for example, means to treat the surface utilizing an adhesion-promoting agent, such as an organo-silane.

To prevent optical defects due to the presence of foreign bodies in the layer formed by spraying, the line can further comprise means to prevent grains of dust and other particles from being deposited on the sheet of glass to be coated, before the spraying, or on the layer formed by spraying, as well as cleaning means to remove these grains of dust which can potentially be deposited.

The means to prevent the depositing of undesirable particles can be physical screens. Thus, the entire production line, or parts of the line, can be placed in one or several enclosures containing filtered and dust-free air.

The means to prevent the depositing of particles can also be electrostatic rods which ionize the atmosphere around the pane during and after the production process.

In the embodiment utilizing electrostatic spraying, the device comprises a sprayer which has been duly adapted.

Other characteristics and advantages will emerge in the following description of examples of the device according to the invention.

The production line shown in FIG. 1 is comprised of a long enclosure 1, which is broken down into compartments corresponding to the treatment zones and is crossed by a conveyor 2 which is also comprised of several parts, to transport the panes 3. The panes are placed horizontally on supports 4 which have been adapted to their shape. The upstream part 5 of the conveyor, formed of a continuous mat, transports the panes through compartment 6 corresponding to the preliminary thermal treatment zone. This compartment 6 is endowed with heating means 7 which straddle the conveyor. These heating means, in this case, are infrared ramps.

An intermediary part 8 of the conveyor transports the panes from the thermal treatment compartment 6 to the compartment 9 corresponding to the spraying zone. The spraying zone is comprised of a sealed compartment, which cannot be penetrated by dust or other particles, like the other elements of enclosure 1: this zone is equipped with centrifuge spraying means 10, the head 11 of which comprises a high-speed turning bowl, as described below. Under the cable mat 12 forming the part of the conveyor in the spraying zone, a reservoir 13 is installed, which collects the excess sprayed reactive mixture.

Another intermediary transporter 14 effects the transfer of the coated panes to the tunnel 15 corresponding to the polymerization zone. In this zone, the panes are transported by the downstream part of the conveyor, which is also comprised of a continuous mat 16, they are heated by heating means such as electrical resistance devices 17, which ensure the polymerization of the sprayed layer 18.

In various locations, the production line comprises means to eliminate static electricity from the environment of the panes to be coated, or those which have been coated, with a sprayed layer. These means can be electrostatic rods 19 which are known in and of themselves.

The line can also comprise cleaning means (not shown) to remove dust and other particles deposited on the pane to be coated or which has already been coated.

Figure 2:
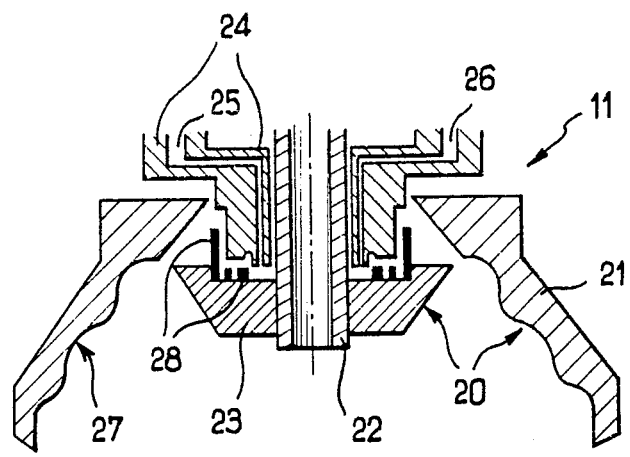
FIG. 2 is a section view of a spray head which can be utilized within the framework of the invention.

The head 11 of the high-speed centrifuge spraying device shown in FIG. 2 contains a mobile part 20 comprised of the turning bowl 21, connected to a mandril 22 supporting a plate 23, and a fixed part 24, penetrated by two feed conduits 25 and 26 for the components, with these conduits issuing into the central part of the plate 23.

To increase the length of the trajectory for the mixture of the two components introduced by conduits 25 and 26 and also to improve this blending before spraying, the bowl presents an internal surface 27 whose generating lines are undulated on the one hand, and the plate 23 bears bumps or ribs 28 which are directed upwards forming obstacles, on the other hand.

Figure 3:
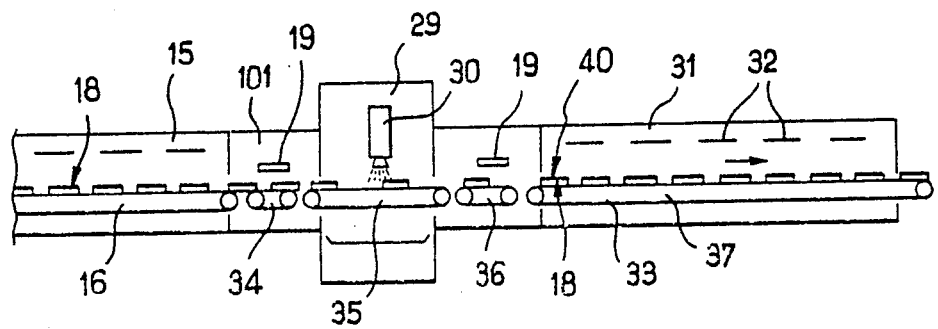
FIG. 3 is a schematic view of a production line for panes comprising a glass sheet, an energy absorbent layer and an internal protection layer, both of which are formed by reactive spraying.

FIG. 3 shows a production line for a safety pane comprising a sheet of glass, a layer having energy-absorbent properties and a coating layer presenting improved surface properties, with these two layers being formed according to the invention by the reactive spraying of reactive mixtures.

This line comprises the same elements as the line described in relation to FIG. 1, but it also comprises means for the production of the second layer, i.e., the IP coating layer, with these means being essentially the same as those described for the production of the first layer, namely, a spraying zone 29, equipped with centrifuge spraying means 30 to form the layer 40 over the already-formed layer 18, followed by a polymerization zone 31 endowed with electrical resistance devices 32, and a conveyor 33 formed of several parts 34, 35, 36, 37.

EXAMPLE 1

Following the process in accordance with the invention, utilizing the device described in relation to FIG. 1, a safety pane made of a convex sheet of glass, which is 3 mm thick, and a layer of plastic material having energy absorbent properties (EA layer), which is 0.480 mm thick, is formed.

The mixture to be sprayed which is suitable for forming the EA layer, is made from a polyalcohol component and an isocyanate component. The polyalcohol component is prepared in advance by mixing polytetramethylene glycol having a molecular mass of 1000 with 1,4-butanediol and polycaprolactonetriol having a molecular mass of 300, with the proportions of the constituents being such that the polytetramethyleneglycol supplies 0.35, the 1,4-butanediol supplies 0.55 and the polycaprolactonetriol supplies 0.10 in hydroxyl group equivalents.

A stabilizer is incorporated with the polyalcohol in a proportion of 0.5% by weight of the total mass of the polyalcohol component and the isocyanate component, a layering agent in a proportion of 0.05% by weight, calculated in the same manner, and a dibutyltin dilaurate catalyst in a proportion of 0.02% by weight, calculated in the same manner as above.

The isocyanate component utilized is 3-isocyanatomethyl-3,5,5-trimethylcyclohexylisocyanate (IDPI) presenting carbamide functions obtained by partial hydrolysis of the IPDI and having an NCO group content of about 31.5% by weight.

The components are taken in quantities such that the NCO/OH ratio is 1.

The convex glass sheets are placed horizontally on supports adapted to their shape. The conveyor transports the glass sheets first to the thermal treatment zone, in which they are heated to a temperature of about 55 degrees C. The glass sheets are next taken to the spraying compartment.

At the spraying station, the glass sheets are sprayed with the reactive mixture described above.

The centrifuge spraying es effected while the reactive mixture is at about 25 degrees C., utilizing a bowl turning at a speed of about 20,000 revolutions per minute, with the diameter of the bowl being about 65 mm, and the blowing pressure guiding the particles, i.e., the pressure of the air directed in a conical form upon issuing from the bowl, is about 1.5 kg. Thus, a layer, which is 0.480 mm thick, is formed. The panes are next taken into the polymerization tunnel, where they are exposed to a temperature of 120 degrees C. for about 25 minutes.

The pane which is produced possesses an excellent optical quality and perfect transparentness.

The adherence obtained between the glass sheet and the layer of plastic material is measured through the use of a peeling test described below.

A band, 5 cm wide, is cut on the plastic coating layer. The end of the band is pulled away and traction is applied to it, perpendicular to the surface of the pane, at a speed of 5 cm per minute. The operation is conducted at +20 degrees C. The average traction force necessary to pull the band away is noted. Through the use of this process, a traction force of 11 daN/5 cm is obtained.

Shock resistance tests at different temperatures are performed on panes produced according to the example. A first shock resistance test is effected at +20 degrees C. with a steel ball weighing 2.260 kg (large ball test) which is made to drop on the center portion of the sample compound pane having a 30.5 cm side, supported on a rigid frame. The approximate height for which 90% of the samples tested at the chosen temperature resist the drop of the ball without being penetrated is determined.

For the compound pane in accordance with the example, the value obtained is 5 meters.

Another shock resistance test is effected with a steel ball weighing 0.227 kg (small ball) which is 38 mm in diameter. A test is performed at a temperature of −20 degrees C. Another test is conducted at a temperature of +40 degrees C. The values obtained are respectively 13.5 and 9 meters.

These values are sufficient to meet European standard R43 in effect, with the desired results being at least 4 meters with the large ball, at least 8.5 meters with the small ball at 20 degrees C. and at least 9 meters with the small ball at +40 degrees C.

EXAMPLE 2

According to the process of invention, utilizing the device described in relation to FIG. 3, a safety pane comprising a convex sheet of glass, which is 3 mm thick, is formed, with a layer of plastic material having energy-absorbent properties (EA layer), which is 0.550 m thick, and a layer of plastic material having surface properties (IP layer), which is 0.070 mm thick with these two layers being formed by reactive spraying, is made.

The reactive mixture utilized to form the AE layer is the same as that which is utilized in Example 1.

The reactive mixture utilized to form the IP layer is made from a polyalcohol component and an isocyanate component in the presence of a stabilizer, a catalyst and a layering agent taken in the following proportions:

100 g of a polyether polyalcohol having a molecular weight of about 450 obtained by condensation of 1,2-propylene oxide with 2,2-bis (hydroxymethyl)-1-butanol and having a free hydroxyl radical content of about 10.5 to 12%, 5.2 g of a UV stabilizer, 0.05 g of dibutyltin dilaurate as a catalyst and 0.2 g of a fluoroalkyl ester as a layering agent, 102 g of a biuret of 1,6-hexamethylenediisocyanate having a free isocyanate radical content of about 23.2%.

The polyalcohol component presents a viscosity of about 620 centipoises at 25 degrees C., while the isocyanate component presents a viscosity of about 2300 centipoises. The stabilizer, the catalyst and the layering agent are added to the polyalcohol component in advance.

The convex glass sheets are placed horizontally on supports adapted to their shape. The conveyor first takes the glass sheets to a thermal treatment zone where they are heated to a temperature of about 55 degrees C. The glass sheets are next taken to the spraying compartment in which they are sprayed with the reactive mixture described above to form the EA layer. The spraying is done as in Example 1. The panes are next taken into the polymerization tunnel, in which they are exposed to a temperature of 120 degrees C. for about 20 minutes. After cooling at 55 degrees C. in the intermediary compartment, the panes next arrive at the spraying post for the formation of the IP layer. The centrifuge spraying is effected while the reactive mixture described, which is suitable to form the IP layer, is at about 25 degrees C., utilizing a bowl turning at a speed of about 20,000 revolutions per minute, with the diameter of the bowl being about 65 mm. Thus, an IP layer of about 0.070 mm is formed, which is polymerized in the polymerization tunnel, in which the pane is exposed to a temperature of about 100 degrees C. for 20 minutes.

The panes produced present a good optical quality and their mechanical characteristics are as follows:

the peeling test provides a value of 11 daN/5 cm, the large ball test and the two small ball tests give the respective values of 5, 13.5 and 10 meters.

The scratch resistance of the IP layer is measured according to the test known as the "Mar Resistance Test", performed with the ERICHSEN apparatus, type 413. The load to be applied to a diamond head to introduce a permanent scratch on the layer of plastic coating material is measured. Here, scratch resistance is 20 g. The abrasion resistance of the IP layer is measured according to European standard R43. For this purpose, the pane coated with the IP protection layer is subject to abrasion through the use of an abrasive wheel. After 100 abrasive turns, the difference in cloudiness between the part which has undergone abrasion and the untreated part is measured with a spectrophotometer.

The cloudiness difference must be under 4%. The value obtained for the pane according to the invention is 3.5%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the production of a compound pane comprising a glass sheet having thereon a transparent polyurethane-based layer having energy-absorbant properties, wherein said polyurethane-based coating layer having energy absorbing properties is formed directly on said glass sheet by the reactive spraying of a reactive mixture of an isocyanate component having a viscosity under 5,000 centipoises at 40° C. and a polyalcohol component, wherein said isocyanate component contains at least one aliphatic or cycloaliphatic diisocyanate or a prepolymer of the isocyanates, and wherein said polyalcohol component contains at least one long difunctional poloyalcohol having a molecular weight of from between 500 and 4000 and at least one short diol having a molecule weight under about 300 as a chain extending agent, (1) wherein said isocyanate component and said polyalcohol component are used in a quantity such that the ratio of isocyanate group equivalents to hydroxyl group equivalents is at least about 0.9, or (2) wherein said isocyanate component and said polyalcohol component are used in a quantity such that the ratio of isocyanates group equivalents to hydroxyl group equivalent is at least about 0.8 when at least one of said components is trifunctional.

2. Process according to claim 1, wherein the isocyanate component contains carbamide functions, with the carbamide content at most 10% of the total weight of the isocyanate component.

3. Process of claim 2, wherein the carbamide content is between 5 and 7.

4. Process according to claim 1, wherein the isocyanate component contains 3-isocyanatomethyl-3,5,5-trimethylcyclohexylisocyanate.

5. Process according to claim 1, wherein the isocyanate component and the polyalcohol component of the polyurethane having energy-absorbent properties are taken in a quantity such that the ratio of the isocyanate equivalent groups to the hydroxyl equivalent groups is about equal to 1.

6. Process according to claim 1, wherein the proportions between the different polyalcohols are chosen such that the number of hydroxyl equivalent groups due to the short diol represents 20 to 70% of the total of the hydroxyl groups when the ratio of the OH equivalent groups is about 1.

7. Process according to claim 1, wherein the isocyanate component is formed essentially of 3-isocyanatomethyl-3,5,5-trimethylcyclohexylisocyanate presenting carbamide groups and in that the polyalcohol component is formed essentially of polytetramethyeneglycol having a molecular mass of about 1000 and of 1,4-butanediol.

8. Process according to claim 1, wherein the polyalcohol component in addition comprises at least one polyalcohol having a functionality greater than 2.

9. Process according to claim 7, wherein the polyalcohol having a functionality greater than 2 is a triol.

10. Process according to claim 1, wherein, for a total hydroxyl, equivalent for the polyalcohol component of the polyurethane having energy absorbent properties, the long polyalcohol represents 0.30 to 0.45 equivalent, the short diol 0.2 to 0.7 equivalent and the polyalcohol having functionality greater than 2 from 0 to 0.35 equivalent.

11. Process according to claim 1, wherein the polyurethane layer having energy-absorbent properties contains additives including at least one of a catalyst, a layering agent, and a stabilizer.

12. Process according to claim 1, wherein the spraying is a high-speed centrifuge spraying.

13. Process according to claim 11, wherein the centrifuge spraying is effected utilizing a bowl turning at a speed between 1000 and 80000 turns per minute.

14. Process according to claim 11, wherein the mixture of the reactive components is made directly in the spray head.

15. Process according to claim 1, wherein a coating layer having surface properties, which is self-repairing and scratch-resistant, is formed on the layer having energy-absorbent properties which is produced.

16. Process according to claim 14, wherein the sprayed reactive mixture forms a polyurethane which can be thermo-hardened.

17. Process according to claim 14, wherein the reactive spraying is a high-speed centrifuge spraying.

18. A compound pane comprising a glass sheet having thereon a transparent polyurethane-based layer having energy-absorbent properties, wherein said compound pane is obtained by forming directly said polyurethane-based coating layer having energy absorbent properties onto said glass sheet by the reactive spraying of a reactive mixture of an isocyanate component having a viscosity under 5,000 centipoises at 40° C. and a polyalcohol component, wherein said isocyanate component contains at least one aliphatic or cycloaliphatic diisocyanate or a prepolymer of these isocyanates, and wherein said polyalcohol component contains at least one long difunctional polyalcohol having a molecular weight of between 500 and 4000 and at least one short diol having a molecule weight under about 3 as a chain extending agent, (1) wherein said isocyanate component and said polyalcohol component are used in an amount such that the ratio of isocyanate group equivalents to hydroxyl group equivalents is at least about 0.9, or (2) wherein said isocyanate component and said polyalcohol component are used in a quantity such that the ratio of isocyanate group equivalents to hydroxyl group equivalents is at least about 0.8 when one of said components is trifunctional.

19. The process of claim 1, wherein said compound pane obtained is a vehicle windshield.

20. The compound pane of claim 18, wherein said compound pane is a vehicle windshield.

21. The compound pane of claim 18, wherein the isocyanate component contains carbamide functions, with the carbamide content at most 10% of the total weight of the isocyanate component.

22. The compound pane of claim 21, where the carbamide content is between 5 and 7.

23. The compound pane of claim 18, wherein the isaocyanate component contains 3-isocyanatomethyl-3,5,5-trimethylcyclohexylisocyanate.

24. The compound pane of claim 18, wherein the isocyanate component and the polyalcohol component of the polyurethane having energy-absorbent properties are taken in a quantity such that the ratio of the isocyanate equivalent groups to the hydroxyl equivalent groups is about equal to 1.

25. The compound pane of claim 18, wherein the proportions between the different polyalcohols are chosen such that the number of hydroxyl equivalent groups due to the short diol represents 20 to 70% of the total of the hydroxyl groups when the ratio of the OH equivalent groups is about 1.

26. The compound pane of claim 18, wherein the isocyanate component is formed essentially of 3-isocyanatomethyl-3,5,5-trimethylcyclohexylisocyanate presenting carbamide groups and in that the polyalcohol component is formed essentially of polytetramethyleneglycol having a molecular mass of about 1000 and of 1,4-butanediol.

27. The compound pane of claim 18, wherein the polyalcohol component in addition comprises at least one polyalcohol having a functionality greater than 2.

28. The compound pane of claim 26, wherein the polyalcohol having a functionality greater than 2 is a triol.

29. The compound pane of claim 18, wherein, for a total hydroxyl equivalent for the polyalcohol component of the polyurethane having energy absorbent properties, the long polyalcohol represents 0.30 to 0.45 equivalent, the short diol 0.2 to 0.7 equivalent and the polyalcohol having functionality greater than 2 from 0 to 0.35 equivalent.

30. The compound pane of claim 18, wherein the polyurethane layer having energy-absorbent properties contains additives including at least one of a catalyst, a layering agent, and a stabilizer.

31. The compound pane of claim 18, wherein the spraying is a high-speed centrifuge spraying.

32. The compound pane of claim 30, wherein the centrifuge spraying is effected utilizing a bowl turning at a speed between 1000 and 80000 turns per minute.

33. The compound pane of claim 30, wherein the mixture of the reactive components is made directly in the spray head.

34. The compound pane of claim 18, wherein a coating layer having surface properties, which is self-repairing and scratch-resistant, is formed on the layer having energy-absorbent properties which is produced.

35. The compound pane of claim 33, wherein the sprayed reactive mixture forms a polyurethane which can be thermo-hardened.

36. The compound pane of claim 33, wherein the reactive spraying is a high-speed centrifuge spraying.

* * * * *